Figure 1:
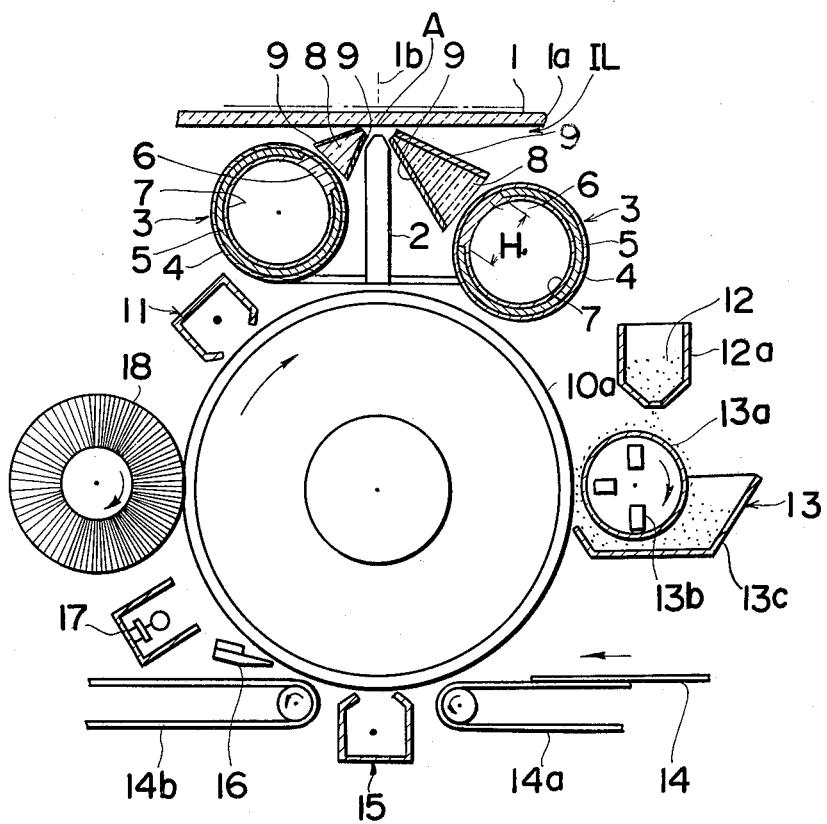

United States Patent
Hamaguchi et al.

[11] 3,947,106
[45] Mar. 30, 1976

[54] ILLUMINATION MEANS FOR USE IN PHOTOCOPYING MACHINE

[75] Inventors: Hiroshi Hamaguchi; Atsuyuki Tanaka, both of Sakai, Japan

[73] Assignee: Minolta Camera Kabushiki Kaisha, Osaka, Japan

[22] Filed: Oct. 10, 1974

[21] Appl. No.: 513,923

[30] Foreign Application Priority Data
Oct. 22, 1973  Japan.............................. 48-122879

[52] U.S. Cl. ........................ 355/1; 355/67; 355/70; 350/96 R; 240/1 LP
[51] Int. Cl.[2].................... G02B 5/14; G03B 27/54
[58] Field of Search......... 355/67, 70, 1, 8, 84, 133; 350/96 R; 240/1 LP

[56] References Cited
UNITED STATES PATENTS

| | | | |
|---|---|---|---|
| 3,073,234 | 1/1963 | Roganti............................. | 355/84 X |
| 3,416,862 | 12/1968 | Levin ................................. | 355/70 |
| 3,643,103 | 2/1972 | DuBuis et al. ................ | 350/96 R X |
| 3,705,768 | 12/1972 | Moraw et al............................ | 355/8 |

*Primary Examiner*—Robert P. Greiner
*Attorney, Agent, or Firm*—Wenderoth, Lind & Ponack

[57] ABSTRACT

An illumination means for use in association with a SELFOC image transmitter in a photocopying machine. The illumination means comprises at least one light generator in the form of a tubular fluorescent lamp or similar means emitting light through a slit disposed parallel to the longitudinal axis thereof, and an associated light-guide which is made of glass, plastic, or other material having a high refractive index, is generally equal in length to the light-generator, has a generally trapezoidal cross-section, and directs light emitted by the light-generator into an illumination slot or shutter means provided in or below a document rest for illumination of successive portions of a document to be copied, the light-guide broad base and narrow base being proximate to, in line with, and generally equal in width to the light-generator slit and the document rest slot, respectively. Preferably the sides of the light-guide are coated with a reflective film, and a certain area of the central portion of the base thereof may be coated with a reflective patch to eliminate extra light, and so counteract the characteristic tendency of a tubular lamp to produce a greater quantity of light at the centre. The means of the invention presents the advantages that there is an even distribution of light for illumination of documents to be copied, that there is less consumption of electricity and less generation of heat, and that the means consists of unitary elements which may be easily assembled.

4 Claims, 3 Drawing Figures

U.S. Patent    March 30, 1976    3,947,106

ILLUMINATION MEANS FOR USE IN PHOTOCOPYING MACHINE

The present invention relates to an illumination means, and more particularly to an illumination means for use in a photocopying machine employing in its optical system a "SELFOC" type image transmitter.

In recent years there has been a general endeavour to provide photocopying machines that are more compact, a contribution to this endeavour being, for example, the provision of a photocopying machine employing an image transmitter constituted by a plurality of "SELFOC" (a trademark registered in Japan and owned by Nippon Sheet Glass Co., Ltd.) lenses in a bundled configuration.

The SELFOC lens refers to an image transmitting optical fibre made of glass or synthetic resin and having a refractive index distribution in a cross section thereof that varies consecutively and parabolically outwards from the centre portion thereof, said refractive index distribution satisfying the following equation: $n = N(1-ar^2)$, wherein N is a refractive index at the centre, $n$ is a refractive index at a distance r from the centre, and a is a positive constant.

In a photocopying machine light is directed onto successive portions of a document to be copied and is reflected thereby into an image transmitter such as described above which directs this image-carrying light onto successive portions of a photosensitive material, which is carried by a rotatory drum or other suitable means past a series of work stations for effecting in succession various work operations, including, for example, charging of the photosensitive material to permit formation thereon of an electrostatic image, dusting of charged toner particles which may adhere to the photosensitive material in a pattern corresponding to the electrostatic image thereon, transfer of the adhering toner particles to a sheet of copy paper, and cleaning of the photosensitive material of any remnant toner particles.

A problem associated with conventional image transmitters is that in general an image transmitter needs an extremely short optical path length (on the order of 50mm for an 800mm size needed by spherical lens assembly, for example), and so suitable positioning and mounting of an illumination means in a photocopying machine employing a conventional image transmitter is rendered difficult.

Another problem associated with conventional means is that a comparatively strong source of light is required if image transmission is to be effected satisfactorily. Because this light source is in an enclosed space, the heat generated thereby is liable to have an adverse effect on the properties of the photosensitive material on which the electrostatic images are formed and may also cause softening of the synthetic resin, or similar binder, employed to hold the light-conducting fibres of the image transmitter in a correct bundles array, thus resulting in the possibility of slight displacement of fibres from a correct alignment and lowered accuracy and effectiveness of the image transmitter.

Also, when employing a SELFOC or similar image transmitter, if there is any unevenness in the light for illumination of a document being copied and transmission of an image thereof along the longitudinal axis of the image transmitter, the resulting image formed on a photosensitive material, and hence in the completed copy, has striped portions and so is unsatisfactory. For this reason, it is necessary to use a slit light source and to limit illumination to successive longitudinal portions of the document being copied. In other words, the width of the image that can be effectively transmitted is limited to the very narrow range defined by the aperture angle of an image transmitter.

It has been attempted to resolve this problem of illumination by the employment of a halogen lamp having a continuous filament disposed along the longitudinal axis thereof. However, characteristics of a halogen lamp are such that it is a large consumer of power, and that it generates a large amount of heat, which may adversely affect photosensitive material or the image transmitter, as described above.

It is accordingly an object of the present invention to provide an illumination means for use in a photocopying equipment which ensures generation of evenly distributed light for carrying images of documents to be copied along an image transmitter.

It is a further object of the invention to provide an illumination means which is low in consumption of energy and generates minimum heat.

In accomplishing these and other objects, there is provided, according to the present invention, an illumination means comprising at least one tubular light-generator, light from which passes through a slit formed along the longitudinal axis thereof into a light-guide, which has a length generally equal to that of the light-generator and generally trapezoidal cross-section and which directs light for illumination of a document and subsequent reflection into an image transmitter onto the document at a suitable angle, for example 45°. Illumination of the whole of a document is effected by, for example, moving the document in a manner to bring the successive portions thereof into line with a transparent slot onto which light is directed by the light-guide. Efficiency of the means of the invention is increased by the provision of two illumination means, which need not necessarily be of the same size, and are disposed symmetrically on opposite sides of an image transmitter.

Figure 2:
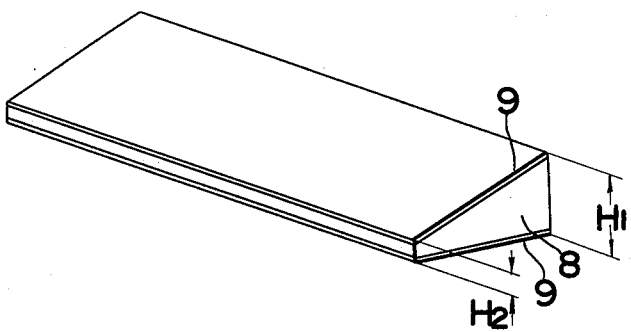
Figure 3:
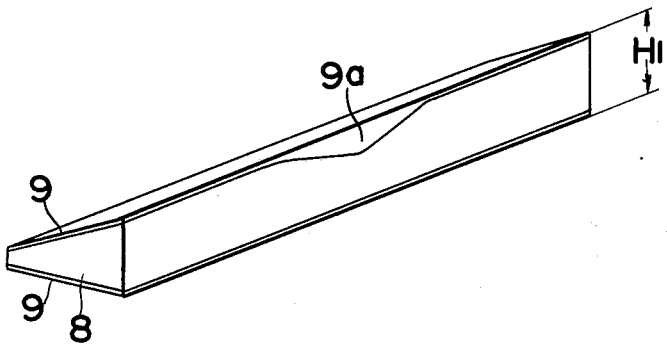

A better understanding of the present invention from the following full description of the preferred embodiment thereof when read in conjunction with the attached drawings, in which like numbers refer to like parts, and FIG. 1 is a schematic lay-out view of a photocopying machine employing an illumination means according to the invention;

FIG. 2 is a perspective view of a light-guide seen from the light exit side thereof; and FIG. 3 is a perspective view of a light-guide seen from the light-entry side thereof, and illustrating internal configuration thereof.

Referring to FIG. 1, there is shown, a document 1 which is supported horizontally on a document rest 1a provided in an uppermost location in a copying machine, and which may be carried, in a conventionally known manner, past a slot 1b, through which light may be directed onto and reflected from successive portions of the document 1. Light is directed onto successive portions of the document 1 by illumination units IL according to the invention, which are described in further detail below. Image-wise light reflected from the document 1 is directed into a vertically aligned image-transmitter 2, which is constituted of SELFOC fibres in a bundled configuration and directs the light onto an electrophotosensitive medium 10a constituting the outer surface of a drum 10 which is rotatable about a horizontal axis. When the drum 10 is rotated, successive portions thereof are brought into line with a charging station 11, including, for example, a corona discharger for imposing a uniform charge on the electrophotosensitive medium 10a. After this, the charged drum portions are brought into line with the image-transmitter 2, which directs image-wise light onto the electrophotosensitive medium 10a to form thereon an electrostatic image in correspondence with the contents of the document 1. The drum 10 is then carried past a developing station 13, comprising a rotatory sleeve 13a which is made of an electrically conductive material and has provided therein permanent magnets 13b, and which charges toner particles 12 supplied thereonto from a suitably located hopper 12a, and by rotation, causes the toner particles 12 to contact the drum 10, causes certain of the charged toner particles 12 to adhere to the electrophotosensitive medium 10a in a pattern defined by the electrostatic image, and causes the remaining particles 12 to fall into a retainer box 13c surrounding the lower half of the rotatory sleeve 13a. The electrostatic image portions of the drum 10 thus coated are then carried past a transfer station 15, whereat copy paper 14 supplied thereto by a feed-in belt 14a, is charged by a corona discharger, and has transferred thereonto the toner particles 12, which are oppositely charged, whereby there is formed on the copy paper 14 an image corresponding to the contents of the original document 1. The copy paper 14 adheres slightly to the drum 10 and is carried thereby past the transfer station 15, and into contact with a separator pawl 16, which separates the copy paper 14 from the drum 10, copy paper 14 being subsequently transferred out of the photocopying machine by a feed-out belt 14b. Meantime the drum 10 is carried past a so-called eraser lamp 17, which cancels remnant electrical charge on the drum 10. Then remnant toner particles 12 on the drum 10 are completely removed by a rotatory cleaner brush 18, which makes the electrophotosensitive medium 10a clean and ready for charging again at the charging station 11, and for effecting production of another document copy.

Still referring to FIG. 1, the illumination units IL are disposed below the document rest 1a and on opposite sides of the image-transmitter 2. One is slightly larger than the other, and each comprises a light-generator 3 and a light-guide 8. Each light-generator 3 is a reflector-type fluorescent tube having suitable electrical connection (not indicated) and having an outer case defined by a glass tube 4. A reflective film 5 covers the entirety of the inner surface of the glass tube 4 except for a band which lies parallel to the longitudinal axis of the tube 4 and constitutes in effect a slit 6 having a maximum width H. The inside of the reflective film 5 is coated with a fluorescent material 7. An imaginary line drawn through the centre of the circle defined by the tube 4 and the centre of the slit 6 is inclined at approximately 45° to the horizontal and an extension thereof passes along the central axis of a light-guide 8, which is positioned between the light-generator 3 and the document rest 1a, to the slot 1b, whereby, at any given time, light from the light-generator 3 may illuminate a portion A of the document 1 in line with the slot 1b.

As indicated in greater detail in FIGS. 2 and 3, each light-guide 8 which has a length generally equal to that of a light-generator 3, has a generally trapezoidal cross section. The lower base of the light-guide 8 (i.e., the base which is lowermost when the light-guide 8 is mounted in a copying machine) is the broader base, and has a width H1 which is generally equal to the maximum width H of the light-generator slit 6. The upper, narrow base of the light-guide 8 has a width H2 generally equal to the width of the slot 1b through which a document portion A may be illuminated. The light-guide 8 is made of transparent plastic, glass, or other suitable material able to effect faithful transmission of light, and the sides thereof are coated with a reflective film 9 formed by spattered aluminium, for example.

Referring back to FIG. 1, in each illumination unit IL on opposite sides of the image transmitter 2, a light-guide 8 is positioned between a light-generator 3 and the slot 1b, with the lower base thereof aligned with the light-generator slit 6, and the upper base thereof being proximate to and in line with the slot 1b. Thus, light emitted by a light-generator 3 is transmitted through the slit 6 thereof, through the corresponding light-guide 8 and into the slot 1b to illuminate a document portion A, whose image is reflected downwards into the image transmitter 2 as described earlier.

The refractive index of the light-guide 8 is evidently higher than that of air, which is the light transmission medium in a conventional means employing lamps and focusing mirrors, and to keep dispersion to a minimum the height of the light-guide 8, i.e., the distance from base to base thereof, is made small. This is also in accordance with the general object of keeping the illumination means construction compact to make possible a smaller photocopying machine. From the point of view of assembly and maintenance, the light-guide 8 has the advantage that it is easily handled as a single unit, as opposed to, for example, focusing mirrors which must be each separately and carefully set at a particular angle. Also, the provision of the light-guide 8 means that a light-generator 3 may be positioned much closer to the illumination slot 1b than is possible in conventional means, and so needs to produce a smaller quantity of light to effect the same illumination of a document. Tests conducted by the inventor showed that illumination efficiency with the means of the invention is 2 – 3 times greater than that obtainable with conventional means. Therefore, with this invention consumption of electrical energy is less, and there is less generation of heat to adversely affect other elements in a photocopying machine.

A characteristic of a fluorescent tube such as employed for the light-generator 3 is that emission of light at the ends thereof is generally less than at the centre thereof, thus resulting in uneven illumination of a document portion A. Conventionally, a method for resolving this problem is to provide in front of the fluorescent tube, i.e., facing the light emission side thereof, a differential filter having greater transmittivity at the ends than at the centre, to counterbalance the effects due to the light emission characteristics of the fluorescent tube. Such a method, however, has the disadvantage that the filter is a delicate piece of extra equipment which is difficult to mount accurately. According to the present invention, this problem is resolved simply by the inclusion of an additional reflective film portion 9a, which, as shown in FIG. 3, covers a generally semi-circular area formed at the central portion of one edge of the light-guide lower base. This reflective film portion 9a reduces the effective width Hl, and hence the amount of light transmittable, at the centre of the light-guide 8, and also causes a certain portion of the light received at the light-guide 8 from the light-generator 3 to be not transmitable, thus resulting in an even distribution of light transmitted through the light-guide 8.

The photocopying machine in which the abovedescribed embodiment of the invention may be employed, was described as a machine in which a document to be copied is moved relative to a stationery illumination slot and illumination and image transmitter means. Needless to say, however, the means of the invention may be employed equally well in other types of photocopying machine, for example, one in which illumination and image transmission means are moved to scan successive portions of a stationary document, or one in which photosensitive material for reception and subsequent transfer of an image is transported over a path, which may have varying shape, by a conveyor belt, rather than by a drum.

Further, whereas the invention has been described in detail with reference to a preferred embodiment of the invention, it will be understood that variations and modifications can be effected within the scope of the invention. For example, a light-generator 3 may be surrounded except for a slit 6' by a tubular reflecting mirror rather than being coated with a reflective film, the light-guide 8 need not essentially be coated with a reflective film 9, since dispersion of light in the light-guide 8 is very small, or the lower base of the light-guide 8 rather than being flat may be curved with the same angle of curvature as the outer surface of the light-generator 3.

What is claimed is:

1. An improved illumination means for use in a photocopy machine which uses in its optical system an image transmitter comprised of a plurality of image transmitting fibers bundled together to transfer the illuminated object image being copied to the copying means within the copying machine, said improvement comprising:

at least one tubular light-generation means positioned adjacent said image transmitter for generating the light necessary to illuminate the object image being transmitted through the image transmitter and having a light emission slit parallel to the longitudinal axis thereof directed toward the object to be illuminated;

at least one light-guide means of light conductive material having a trapezoidal longitudinal cross-section, the wide base of the trapezoidal shape positioned adjacent the emission slit of the light generation means and the narrow base of the trapezoidal shape directed toward the object to be illuminated; and light distribution means centered on the base of the light guide means adjacent said light emission slit for ensuring even distribution of the light from the light emission slit entering the light guide means across the entire cross-section area of the base of said light guide means.

2. An improvement as claimed in claim 1 wherein said light distribution means is comprised of a generally semi-circular opaque material centered on the broad base of the light guide means adjacent to the light emission slit of the light generation means, whereby the light transmitted to the center of the light guide means from the center of the tubular light-generation means is reduced and the light from the tubular light-generation means is evenly distributed through the light guide means.

3. An improvement as claimed in claim 1, wherein said light generator and light guide means are symmetrically provided on two opposite sides of said image transmitter directed toward the object to be illluminated.

4. An improvement as claimed in claim 3, wherein the sides of said light guide means are coated with a reflective film.

* * * * *